(12) United States Patent
Kimura

(10) Patent No.: US 7,986,104 B2
(45) Date of Patent: Jul. 26, 2011

(54) DISCHARGE LAMP LIGHTING APPARATUS

(75) Inventor: Kengo Kimura, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 475 days.

(21) Appl. No.: 12/295,674

(22) PCT Filed: Apr. 10, 2007

(86) PCT No.: PCT/JP2007/057879
§ 371 (c)(1),
(2), (4) Date: Oct. 1, 2008

(87) PCT Pub. No.: WO2007/117011
PCT Pub. Date: Oct. 18, 2007

(65) Prior Publication Data
US 2009/0251055 A1    Oct. 8, 2009

(30) Foreign Application Priority Data

Apr. 12, 2006 (JP) ................................. 2006-110007

(51) Int. Cl.
*H05B 41/16* (2006.01)
(52) U.S. Cl. ........................................ 315/282; 315/291
(58) Field of Classification Search .......... 315/274–282, 315/291, 307
See application file for complete search history.

(56) References Cited

U.S. PATENT DOCUMENTS

| | | | |
|---|---|---|---|
| 7,397,198 B2* | 7/2008 | Oyama | 315/282 |
| 2005/0017647 A1* | 1/2005 | Huang | 315/119 |
| 2005/0253536 A1 | 11/2005 | Oyama | |
| 2006/0043909 A1 | 3/2006 | Hwang et al. | |
| 2009/0267536 A1* | 10/2009 | Wang et al. | 315/297 |
| 2009/0322245 A1* | 12/2009 | Horikawa | 315/287 |

FOREIGN PATENT DOCUMENTS

| | | |
|---|---|---|
| JP | 2004 228476 | 8/2004 |
| JP | 2005 251580 | 9/2005 |
| JP | 2005 353572 | 12/2005 |
| JP | 2006 66361 | 3/2006 |

* cited by examiner

*Primary Examiner* — Don P Le
(74) *Attorney, Agent, or Firm* — Oblon, Spivak, McClelland, Maier & Neustadt, L.L.P.

(57) ABSTRACT

A discharge lamp lighting apparatus includes a first inverter, a second inverter to output a voltage whose phase is opposite to that of a voltage provided by the first inverter, a discharge lamp connected between a first output terminal of the first inverter and a first output terminal of the second inverter, a first current detection circuit arranged between a second output terminal of the first inverter and a common potential and having a first current detection element and a second current detection element that are connected in series, a second current detection circuit arranged between a second output terminal of the second inverter and the common potential and having a third current detection element and a fourth current detection element that are connected in series, and a protection circuit to detect a current abnormality according to a composite signal of outputs of the second and fourth current detection elements and stop the operation of the first and second inverters.

2 Claims, 2 Drawing Sheets

DISCHARGE LAMP LIGHTING APPARATUS

TECHNICAL FIELD

The present invention relates to a discharge lamp lighting apparatus for lighting a discharge lamp such as a cold cathode fluorescent lamp (CCFL), and particularly, to a technique of preventing an abnormal state caused by stray capacitance.

BACKGROUND TECHNOLOGY

FIG. 1 is a view showing a circuit configuration of a discharge lamp lighting apparatus according to a related art. In the discharge lamp lighting apparatus, between a DC power source Vcc and a common potential (for example, the ground), there is a switching circuit 1 in which four switching elements Q1 to Q4 are bridge-connected. The switching elements Q2 and Q4 are n-channel MOS transistors and the switching elements Q1 and Q3 are p-channel MOS transistors. An output of the bridge-connected switching circuit 1 is connected through a resonant capacitor C1 to a primary winding P1 of a first transformer T1, and also, is connected through a resonant capacitor C2 to a primary winding P2 of a second transformer T2.

A first end of a secondary winding S1 of the first transformer T1 is connected to a first electrode of a cold cathode fluorescent lamp (hereinafter simply referred to as a discharge lamp) 2 and a second end of the secondary winding S1 is connected through a current detection resistor R1 to the common potential. A second electrode of the discharge lamp 2 is connected to a first end of a secondary winding S2 of the second transformer T2. A second end of the secondary winding S2 of the second transformer T2 is connected through a current detection resistor R2 to the common potential.

A current passing through the secondary winding S1 of the first transformer T1 is detected as a voltage generated at the resistor R1 and a current passing through the secondary winding S2 of the second transformer T2 is detected as a voltage generated at the resistor R2 (to be explained later in detail). The voltage generated by the resistor R1 is transferred through a diode D1 to an error amplifier 3 and the voltage generated by the resistor R2 is transferred through a diode D3 to the error amplifier 3.

The error amplifier 3 compares the voltage transferred from the resistor R1 through the diode D1 or the voltage transferred from the resistor R2 through the diode D3 with an internally generated reference voltage and sends a resultant error voltage to a PWM comparator 5. The PWM comparator 5 compares a triangular wave generated by a triangular wave generator 4 with the error voltage sent from the error amplifier 3 and generates a pulse signal whose pulse width corresponds to the error voltage. The pulse signal has a wide pulse width if the error voltage is large and a narrow pulse width if the error voltage is small. The pulse signal generated by the PWM comparator 5 is sent to a frequency divider 6.

The frequency divider 6 divides the frequency of the pulse signal sent from the PWM comparator 5, to generate two drive signals for each pulse and sends the drive signals to first and second drivers 7 and 8, respectively. The first driver 7 provides the switching element Q1 with the output of the frequency divider 6 as a drive signal and the switching element Q2 with a phase-inverted signal of the output of the frequency divider 6 as a drive signal. The second driver 8 provides the switching element Q3 with the output of the frequency divider 6 as a drive signal and the switching element Q4 with a phase-inverted signal of the output of the frequency divider 6 as a drive signal.

As a result, a period in which the switching elements Q1 and Q4 simultaneously turn on and a period in which the switching elements Q2 and Q3 simultaneously turn on are determined according to the voltages detected by the resistors R1 and R2. The switching elements Q1 and Q2 or the switching elements Q3 and Q4 never simultaneously turn on. The period in which the switching elements Q1 and Q4 simultaneously turn and the period in which the switching elements Q2 and Q3 simultaneously turn on are alternately produced.

Operation of the discharge lamp lighting apparatus of the related art having the above-mentioned configuration will be explained. When the switching elements Q1 and Q4 turn on, a current supplied from the DC power source Vcc passes through a route extending along the switching element Q1, the capacitor C1, the primary winding P1 of the first transformer T1, the switching element Q4, and the common potential line, to apply voltage to the capacitor C1 and the primary winding P1 of the first transformer T1. As a result, the capacitor C1 and an inductance of the primary winding P1 of the first transformer T1 resonate to produce a current having a sinusoidal waveform.

Also, when the switching elements Q1 and Q4 turn on, the current supplied from the DC power source Vcc passes through a route extending along the switching element Q1, the capacitor C2, the primary winding P2 of the second transformer T2, the switching element Q4, and the common potential line, to apply voltage to the capacitor C2 and the primary winding P2 of the second transformer T2. As a result, the capacitor C2 and an inductance of the primary winding P2 of the second transformer T2 resonate to produce a current having a sinusoidal waveform.

The secondary winding S1 of the first transformer T1 and the secondary winding S2 of the second transformer T2 are wound to generate high voltages sufficient to light the discharge lamp 2. The secondary winding S1 of the first transformer T1 and the secondary winding S2 of the second transformer T2, therefore, generate sinusoidal high voltages Vout1 and Vout2, respectively, that have opposite phases. Due to this, on the secondary side, a current passes in a direction A through a path Ip' extending along the secondary winding S1 of the first transformer T1, the discharge lamp 2, the secondary winding S2 of the second transformer T2, the resistor R2, the resistor R1, and the secondary winding S1 of the first transformer T1, to light the discharge lamp 2. At this time, the resistor R2 generates a voltage proportional to the current passing through the discharge lamp 2, and the voltage is transferred through the diode D3 to the error amplifier 3. On the other hand, the resistor R1 generates a voltage that reversely biases the diode D1 so that the diode D1 turns off to output no voltage.

When the switching elements Q2 and Q3 turn on, a current from the DC power source Vcc passes through a path extending along the switching element Q3, the primary winding P1 of the first transformer T1, the capacitor C1, the switching element Q2, and the common potential line, to oppositely apply voltage to the capacitor C1 and the primary winding P1 of the first transformer T1. As a result, the secondary winding S1 of the first transformer T1 generates a sinusoidal high voltage of opposite phase.

Also, the current from the DC power source Vcc passes through a path extending along the switching element Q3, the primary winding P2 of the second transformer T2, the capacitor C2, the switching element Q2, and the common potential line, to normally apply voltage to the capacitor C2 and the primary winding P2 of the second transformer T2. As a result, the secondary winding S2 of the second transformer T2 generates a sinusoidal high voltage of normal phase.

On the secondary side, a current passes in a direction B through the path Ip' extending along the secondary winding S2 of the second transformer T2, the discharge lamp 2, the secondary winding S1 of the first transformer T1, the resistor R1, the resistor R2, and the secondary winding S2 of the second transformer T2, to light the discharge lamp 2. At this time, the resistor R1 generates a voltage proportional to the current passing through the discharge lamp 2, and the voltage is transferred through the diode D1 to the error amplifier 3.

On the other hand, the resistor R2 generates a voltage to reversely bias the diode D3 so that the diode D3 turns off to output no voltage. As a result, the error amplifier 3 receives a current detection signal formed by alternately combining the voltages generated by the resistors R1 and R2. Based on the current detection signal, the PWM comparator 5 generates a pulse signal to turn on/off the switching elements Q1 to Q4. With this, a current passing through the discharge lamp 2 is controlled to be constant.

DISCLOSURE OF INVENTION

Problems to be Solved by Invention

The discharge lamp lighting apparatus according to the related art of the above-mentioned configuration turns on the discharge lamp 2 by generating high voltages at high frequencies. If a distance from a high-voltage part to a conductor or casing is abnormally short, stray capacitances Cr1 and Cr2 increase to increase leakage currents IL1' and IL2' caused by the stray capacitances Cr1 and Cr2. This discharge lamp lighting apparatus employs voltages generated by the resistors R1 and R2 to control a current passing through the discharge lamp 2. Accordingly, if the leakage currents increase, the current passing through the discharge lamp 2 decreases and becomes unable to secure a required brightness.

To secure the brightness of the discharge lamp 2, the discharge lamp lighting apparatus must supply an additional current for compensating the leakage currents. This may cause overload on the discharge lamp lighting apparatus. The discharge lamp lighting apparatus according to the above-mentioned related art is incapable of solving these problems and continues operation without solving the problems.

To solve these problems, Japanese Unexamined Patent Application Publication No. 2003-17287 discloses a power source apparatus for lighting a cold cathode fluorescent lamp, provided with a ground fault protection function, to prevent a malfunction due to a leakage current. This apparatus arranges a center tap on a secondary winding, and based on a fact that the potential of the center tap varies relative to a common potential if a leakage current occurs, detects whether or not there is a leakage current. According to the detection result, the apparatus stops an inverter.

Means to Solve the Problems

The apparatus disclosed in the patent document 1, however, should arrange a center tap on a transformer, to complicate the structure of the transformer. In addition, the circuit for detecting a potential change of the center tap is difficult to design.

The present invention has been made to solve the above-mentioned problems and provides a discharge lamp lighting apparatus having a simple structure and capable of eliminating an abnormality due to a leakage current.

According to a technical aspect of the present invention, a discharge lamp lighting apparatus includes a first inverter configured to invert DC source power into high-frequency power, a second inverter configured to invert the DC source power into high-frequency power whose phase is opposite to that provided by the first inverter, a discharge lamp connected between a first output terminal of the first inverter and a first output terminal of the second inverter, a first current detection circuit arranged between a second output terminal of the first inverter and a common potential and having a first current detection element and a second current detection element that are connected in series, a second current detection circuit arranged between a second output terminal of the second inverter and the common potential and having a third current detection element and a fourth current detection element that are connected in series, and a protection circuit commonly connected to a connection point where the first and second current detection elements are connected to each other and a connection point where the third and fourth current detection elements are connected to each other, the protection circuit being configured to detect a current abnormality according to a composite signal of outputs of the second and fourth current detection elements and stop the operation of the first and second inverters.

BEST MODE OF IMPLEMENTING INVENTION

An embodiment of the present invention will be explained in detail with reference to the drawings.

Figure 2:
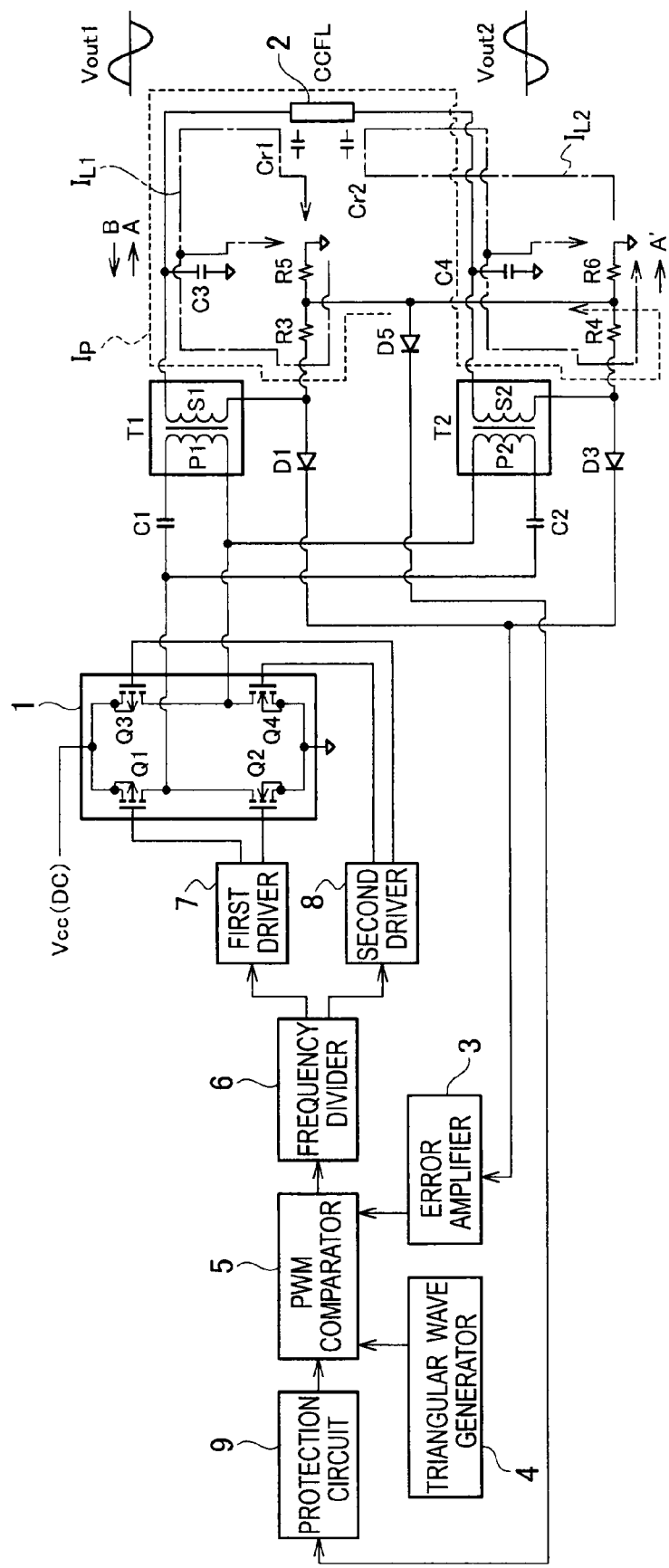
FIG. 2 is a view showing a circuit configuration of a discharge lamp lighting apparatus of both-end high-voltage type according to an embodiment of the present invention.

FIG. 2 is a view showing a circuit configuration of a discharge lamp lighting apparatus according to an embodiment of the present invention. In the discharge lamp lighting apparatus, between a DC power source Vcc and a common potential (for example, the ground), there is a switching circuit 1 in which four switching elements Q1 to Q4 are bridge-connected. The switching elements Q2 and Q4 are n-channel MOS transistors and the switching elements Q1 and Q3 are p-channel MOS transistors.

An output of the switching circuit 1 is connected through a resonant capacitor C1 to a primary winding P1 of a first transformer T1, and also, is connected through a resonant capacitor C2 to a primary winding P2 of a second transformer T2. A first inverter according to the present invention corresponds to the switching circuit 1 and first transformer T1 and a second inverter to the switching circuit 1 and second transformer T2.

A first end of a secondary winding S1 of the first transformer T1 is connected to a first electrode of a discharge lamp 2 and a second end of the secondary winding S1 is connected through current detection resistors R3 (corresponding to a first current detection element of the present invention) and R5 (corresponding to a second current detection element of the present invention) to the common potential. The resistors R3 and R5 form a series circuit that corresponds to a first current detection circuit of the present invention.

A second electrode of the discharge lamp 2 is connected to a first end of a secondary winding S2 of the second transformer T2. A second end of the secondary winding S2 of the second transformer T2 is connected through current detection resistors R4 (corresponding to a third current detection element of the present invention) and R6 (corresponding to a fourth current detection element of the present invention) to the common potential. The resistors R4 and R6 form a series circuit that corresponds to a second current detection circuit of the present invention. A resistance value of the resistor R3 and a resistance value of the resistor R4 are set to be equal to each other. A resistance value of the resistor R5 and a resistance value of the resistor R5 are set to be equal to each other. A first connection point that is a connection point of the resistors R3 and R5 and a second connection point that is a connection point of the resistors R4 and R6 are connected to each other and to an anode of a diode D5. A cathode of the diode D5 is connected to a protection circuit 9. The protection circuit 9 generates a control signal if a signal sent from the diode D5 is equal to or larger than a predetermined voltage and sends the control signal to a PWM comparator 5, to stop the operation of the PWM comparator 5.

A current passing through the secondary winding S1 of the first transformer T1 is detected as a voltage generated at the resistor R3 and a current passing through the secondary winding S2 of the second transformer T2 is detected as a voltage generated at the resistor R4. The voltage generated at the resistor R3 is transferred through a diode D1 to an error amplifier 3 and the voltage generated at the resistor R4 is transferred through a diode D3 to the error amplifier 3.

The error amplifier 3 compares the voltage transferred from the resistor R3 through the diode D1 or the voltage transferred from the resistor R4 through the diode D3 with an internally generated reference voltage and sends a resultant error voltage to the PWM comparator 5.

Figure 1:
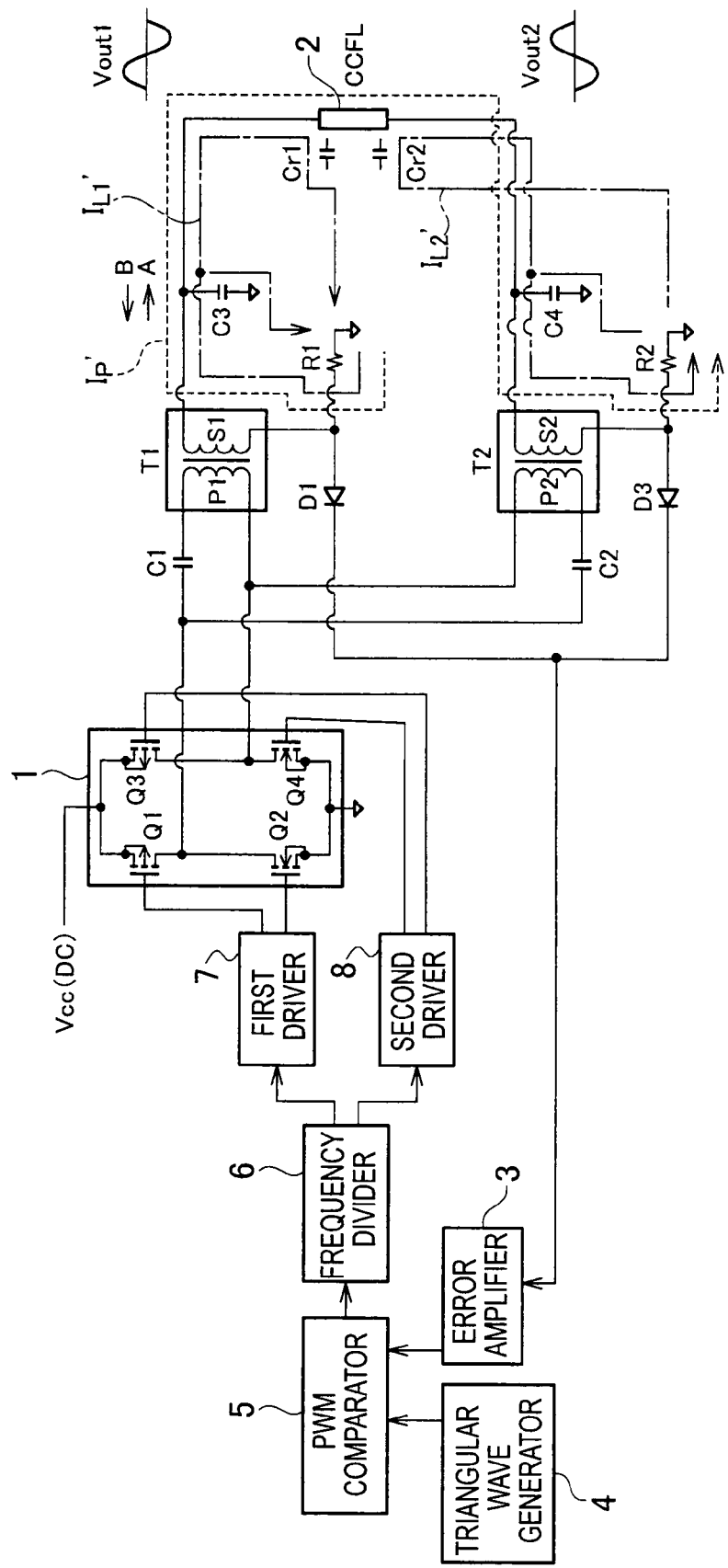
FIG. 1 is a view showing a circuit configuration of a general discharge lamp lighting apparatus of both-end high-voltage type.

The PWM comparator 5, a triangular wave generator 4, a frequency divider 6, a first driver 7, and a second driver 8 are configured like those shown in FIG. 1, and therefore, the detail explanation thereof is omitted.

A normal operation of the discharge lamp lighting apparatus according to the present invention shown in FIG. 2 is the same as that of the general discharge lamp lighting apparatus shown in FIG. 1, and therefore, the explanation thereof is omitted.

An operation when a leakage current occurs will be explained. As an example, an operation when a stray capacitance Cr1 existing around the electrode of the discharge lamp 2 connected to the first transformer T1 passes a leakage current will be explained.

When the switching elements Q1 and Q4 turn on, the above-mentioned primary-side operation takes place and the secondary winding S1 of the first transformer T1 generates a voltage Vout1 that is higher than the common potential. Since the secondary winding S2 of the second transformer T2 is wound opposite to the secondary winding S1 of the first transformer T1, the secondary winding S2 generates a voltage Vout2 that is lower than the common potential. As a result, on the secondary side, a current passes in a direction A through a path Ip extending along the secondary winding S1 of the first transformer T1, the discharge lamp 2, the secondary winding S2 of the second transformer T2, the resistor R4, the resistor R3, and the secondary winding S1 of the first transformer T1, to light the discharge lamp 2. At the same time, a leakage current passes in the direction A through a path IL1 extending along the secondary winding S1 of the first transformer T1, the stray capacitance Cr1, the resistor R5 (and the resistor R6), the resistor R3, and the secondary winding S1 of the first transformer T1.

The current passing through the discharge lamp 2 also passes through the current detection resistors R3 and R4 and the leakage current passes through the resistors R3 and R5. It is noted that the current also passes through the resistor R6, a path involving the resistor R6 is long to increase impedance, and therefore, the current passing through the resistor R6 is smaller than the current passing through the resistor R5. As a result, the resistor R5 generates a voltage. The voltage generated at the resistor R5 is usable to detect the leakage current. According to the embodiment shown in FIG. 2, however, the diode D5 is reversely biased and the voltage generated by the resistor R5 is not transferred to the protection circuit 9.

When the switching elements Q2 and Q3 turn on, the secondary winding S2 of the second transformer T2 generates a voltage Vout2 that is higher than the common potential and the secondary winding S1 of the first transformer T1 generates a voltage Vout1 that is lower than the common potential. As a result, a current passes in a direction B through the path extending along the secondary winding S2 of the second transformer T2, the discharge lamp 2, the secondary winding S1 of the first transformer T1, the resistor R3, the resistor R4, and the secondary winding S2 of the second transformer T2, to light the discharge lamp 2. At the same time, a leakage current passes in the direction B through the path IL1 extending along the secondary winding S1 of the first transformer T1, the resistor R3, the resistor R5 (the resistor R6), the stray capacitance Cr1, and the secondary winding S1 of the first transformer T1.

The current passing through the discharge lamp 2 also passes through the current detection resistors R3 and R4 and the leakage current passes through the resistors R3 and R5. It is noted that the current also passes through the resistor R6, a path involving the resistor R6 is long to increase impedance, and therefore, the current passing through the resistor R6 is smaller than the current passing through the resistor R5. As a result, the resistor R5 generates a voltage. The voltage generated at the resistor R5 is supplied through the diode D5 to the protection circuit 9, which compares it with a reference voltage. In a normal operation, the leakage current, if generated, is small, and therefore, the voltage generated by the resistor R5 is lower than the reference voltage of the protection circuit 9 so that the protection circuit 9 does not output an abnormality signal.

As the stray capacitance Cr1 increases, the leakage current increases to increase the voltage generated by the resistor R5. When the voltage generated by the resistor R5 reaches the reference voltage of the protection circuit 9, the protection circuit 9 outputs an abnormality signal to make the PWM comparator 5 inoperative. This results in stopping the first and second inverters. If the electrode of the discharge lamp 2 is brought abnormally close to, for example, the casing, the leakage current will increase. Then, the embodiment safely stops the first and second inverters.

A stray capacitance Cr2 present in the vicinity of the electrode of the discharge lamp 2 connected to the second transformer T2 may increase to pass a leakage current. This will be explained. When the switching elements Q1 and Q4 turn on, a current passes in the direction A through the path Ip extending along the secondary winding S1 of the first transformer T1, the discharge lamp 2, the secondary winding S2 of the second transformer T2, the resistor R4, the resistor R3, and the secondary winding S1 of the first transformer T1, to light the discharge lamp 2. At the same time, a leakage current passes in a direction A' through a path IL2 extending along the secondary winding S2 of the second transformer T2, the resistor R4, the resistor R6 (the resistor R5), the stray capacitance Cr2, and the secondary winding S2 of the second transformer T2. In this case, a voltage corresponding to the leakage current is mainly generated by the resistor R6 and is detected by the protection circuit 9. When the detected voltage reaches the internal reference voltage of the protection circuit 9, the first and second inverters are stopped. In this way, when the leakage current increases to a predetermined current corresponding to the internal reference voltage of the protection circuit 9, the first and second inverters are safely stopped.

The discharge lamp lighting apparatus according to the above-mentioned embodiment makes the phases of outputs of the first and second inverters opposite to each other and connects the outputs in series with the discharge lamp 2 to supply power to the discharge lamp 2. The outputs of the first and second inverters, therefore, should be synchronized with each other. Namely, the phases thereof must perfectly be opposite to each other.

It is possible to employ one inverter and two transformers whose outputs have opposite phases and use these outputs as the outputs of the first and second inverters. This may realize a simpler configuration.

The resistors R5 and R6 are connected in parallel, and therefore, one of them may be omitted. However, currents passing through these resistors are of high frequencies, and if a leakage current path is long, impedance will increase to disable the detection of a leakage current. To cope with this, a detection resistor may be arranged in the vicinity of each transformer. This results in surely detecting a leakage current.

EFFECT OF THE INVENTION

According to the present invention, if no leakage current is generated, only the first and third current detection elements pass a current. If a leakage current is generated, the leakage current passes through the second and fourth current detection elements, as well. Accordingly, with a simple configuration of arranging only the second and fourth current detection elements that pass only a leakage current, it is possible to surely detect the leakage current. Although the present invention is simple in configuration, it can eliminate an abnormality caused by an increase in a leakage current.

It is possible to control a discharge lamp with one switching circuit and two transformers. This configuration is simpler.

INDUSTRIAL APPLICABILITY

The discharge lamp lighting apparatus according to the present invention is usable for a large-screen display unit.

UNITED STATES DESIGNATION

In connection with United States designation, the present invention claims the benefit of priority under 35 U.S.C. 119 (a) to Japanese Patent Application No. 2006-110007, filed on Apr. 12, 2006, the entire contents of which are incorporated herein.

The invention claimed is:

1. A discharge lamp lighting apparatus comprising:
a first inverter configured to invert DC source power into high-frequency power;
a second inverter configured to invert the DC source power into high-frequency power whose phase is opposite to that provided by the first inverter;
a discharge lamp connected between a first output terminal of the first inverter and a first output terminal of the second inverter;
a first current detection circuit arranged between a second output terminal of the first inverter and a common potential and having a first current detection element and a second current detection element that are connected in series;
a second current detection circuit arranged between a second output terminal of the second inverter and the common potential and having a third current detection element and a fourth current detection element that are connected in series; and
a protection circuit commonly connected to a connection point where the first and second current detection elements are connected to each other and a connection point where the third and fourth current detection elements are connected to each other, the protection circuit being configured to detect a current abnormality according to a composite signal of outputs of the second and fourth current detection elements and make the operation of the first and second inverters inoperative.

2. The discharge lamp lighting apparatus of claim 1, wherein:
the first inverter comprises a switching circuit configured to switch the DC source power and a first transformer having a primary winding whose ends are connected in parallel to outputs of the switching circuit and a secondary winding whose ends form the output terminals of the first inverter; and
the second inverter comprises a second transformer having a primary winding whose ends are connected in parallel to the outputs of the switching circuit and a secondary winding whose ends are the output terminals of the second inverter.

* * * * *